(No Model.)
G. R. HUGHES.
RING GAGE.
No. 500,130. Patented June 27, 1893.
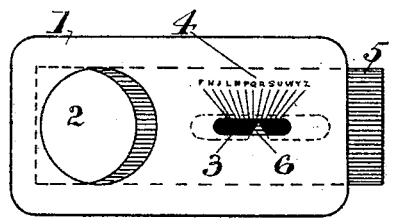
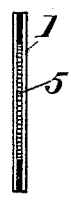
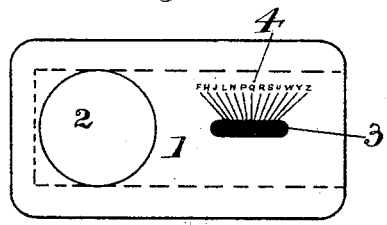
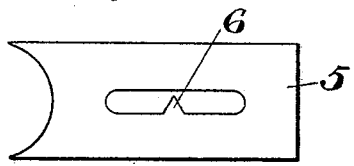
Witnesses:
W. Harvey Muzzy.
Chas. H. Muzzy.
Inventor.
Gibbard Richard Hughes
by W. H. Babcock
Attorney.

UNITED STATES PATENT OFFICE.

GIBBARD RICHARD HUGHES, OF LONDON, ENGLAND.

RING-GAGE.

SPECIFICATION forming part of Letters Patent No. 500,130, dated June 27, 1893.

Application filed February 10, 1893. Serial No. 461,718. (No model.)

*To all whom it may concern:*

Be it known that I, GIBBARD RICHARD HUGHES, a subject of the Queen of Great Britain, residing at No. 77 Leadenhall Street, in the city of London, England, have invented new and useful Improvements in a Gage or Measuring Apparatus, of which the following is a specification.

My invention consists in a gage or measuring apparatus, whereby I am enabled to ascertain with great exactitude diameters or sizes. It is designed more especially for obtaining measurements for finger ring manufacturers, but is adapted for all kinds of diametral measurements.

The construction and operation will be understood by reference to the drawings, in which—

Figure 1. is a general view of the apparatus. Fig. 2. shows the case; Fig. 3. the sliding clip; Fig. 4. an end view.

In the drawings 1, is the outer case formed of card-board or other suitable material fastened together at the edges by glue or other suitable means. At one end is punched a round hole 2, which may be varied to suit the shape and diameter of the object measured. Toward the opposite end and in the front wall of the case an oblong hole or slot 3, is formed and radiating therefrom are a series of lines terminating in figures or letters 4, which represent the manufacturers' standard diametral measure. Within the case is the sliding clip 5, also formed of cardboard or other suitable material, the inner end being preferably of circular shape. In a suitable position in the sliding clip is an indicator or pointer 6, which may be conveniently formed by punching out an oval slot leaving so much of the card or other suitable material as will form the indicating point shown.

The gages may be constructed in wood, ebonite, celluloid, metal or any other suitable substance, and may be employed for ascertaining the diametral measurement or size of any required suitable object; the hole 2, being made of square or other shape and the inner end of sliding clip modified to suit.

The operation of my invention is as follows:—The finger is inserted in the hole 2, and the sliding clip pushed out by the insertion of the finger until the finger can be freely turned round and withdrawn. By following the radial line indicated by the pointer 6, the reference letter or figure can be read off, and the size determined from the manufacturer's standard to which it refers. I find it best to color or blacken the back of the case behind the slot in order to show up more sharply the position of the pointer 6. The dimensions of other objects than finger rings may be obtained and determined in a manner similar to that just described.

I claim—

1. In a gage or measuring apparatus the combination with a hollow casing provided with measuring and index apertures of a measuring slide provided with an index finger and sliding in said casing to close said measuring aperture substantially as set forth.

2. In a gage or measuring apparatus the combination with an apertured casing provided with a standard index of a gage and index slide moving therein substantially as set forth.

3. In a gage or measuring apparatus the combination with a hollow casing provided with measuring and index apertures and a standard index of a slide moving within said casing to close the measuring aperture and being provided with an index finger which is arranged to be seen through the index opening substantially as set forth.

In testimony whereof I have set my hand, in presence of two witnesses, this 24th day of January, 1893.

GIBBARD RICHARD HUGHES.

Witnesses:
 J. M. BOULLON,
 A. CRAWLEY,
*Clerks to Mess. Grain & Sons, Notaries, 46 Lombard St., London, E. C., England.*